United States Patent [19]

Funabashi

[11] 4,442,516

[45] Apr. 10, 1984

[54] DRIVE MECHANISM FOR DISC PLAYER WITH BEARING SUPPORTED SLIDER

[75] Inventor: Tadashi Funabashi, Saitama, Japan

[73] Assignee: Universal Pioneer Corporation, Tokyo, Japan

[21] Appl. No.: 269,163

[22] Filed: Jun. 1, 1981

[30] Foreign Application Priority Data

May 31, 1980 [JP] Japan .................................. 55-72919
May 31, 1980 [JP] Japan .................................. 55-72920
May 31, 1980 [JP] Japan .................................. 55-72921
May 31, 1980 [JP] Japan .................................. 55-72922

[51] Int. Cl.³ ............................................. G11B 21/08
[52] U.S. Cl. ........................................ 369/43; 360/97; 360/78; 369/269; 369/219
[58] Field of Search ............................... 360/97-99, 360/86, 104-107, 78; 369/43, 126, 78-79, 218-219, 266-269; 248/295 C, 298; 308/6 R

[56] References Cited

U.S. PATENT DOCUMENTS 2,925,238 2/1960 Lynott .................................. 360/106
3,470,399 9/1969 Johnson et al. ..................... 360/106
3,721,967 3/1973 Englert et al. ...................... 360/106
3,922,720 11/1975 Caletti et al. ....................... 360/106
4,143,409 3/1979 Iwabuchi et al. ................... 360/105

Primary Examiner—Stuart N. Hecker
Attorney, Agent, or Firm—Sughrue, Mion, Zinn, Macpeak, and Seas

[57] ABSTRACT

A reading device drive mechanism for a video disk player including a chassis, a pair of guide rails mounted parallel to one another on the chassis, a slider contacting corresponding sides of the guide rails through bearings, and a retainer for restricting deviation of the bearings supported and engaged with the guide rails with a retainer being slidable in the longitudinal direction of the guide rails. The retainer has windows formed therein through which the bearings are insertable with a lower edge portions of the windows being formed with a resiliency so that the bearings can be detachably mounted in corresponding ones of the windows.

16 Claims, 17 Drawing Figures

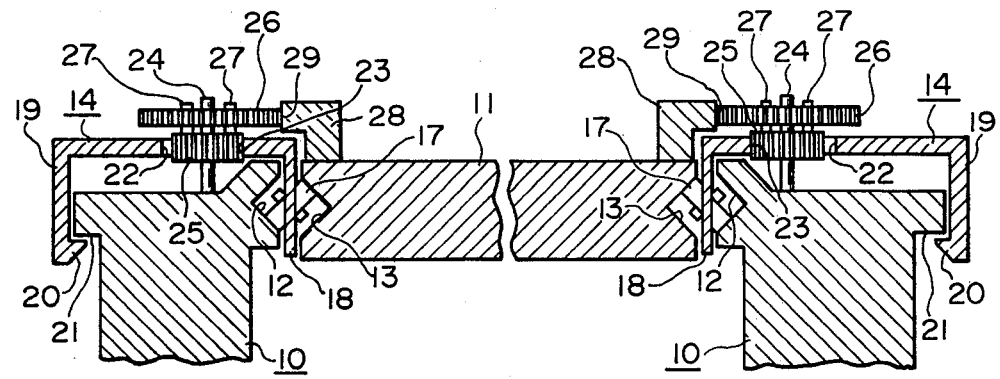
FIG. 3
FIG. 5
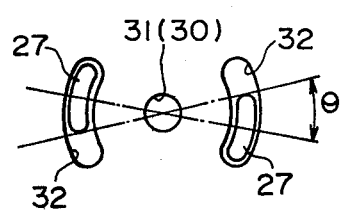
FIG. 6
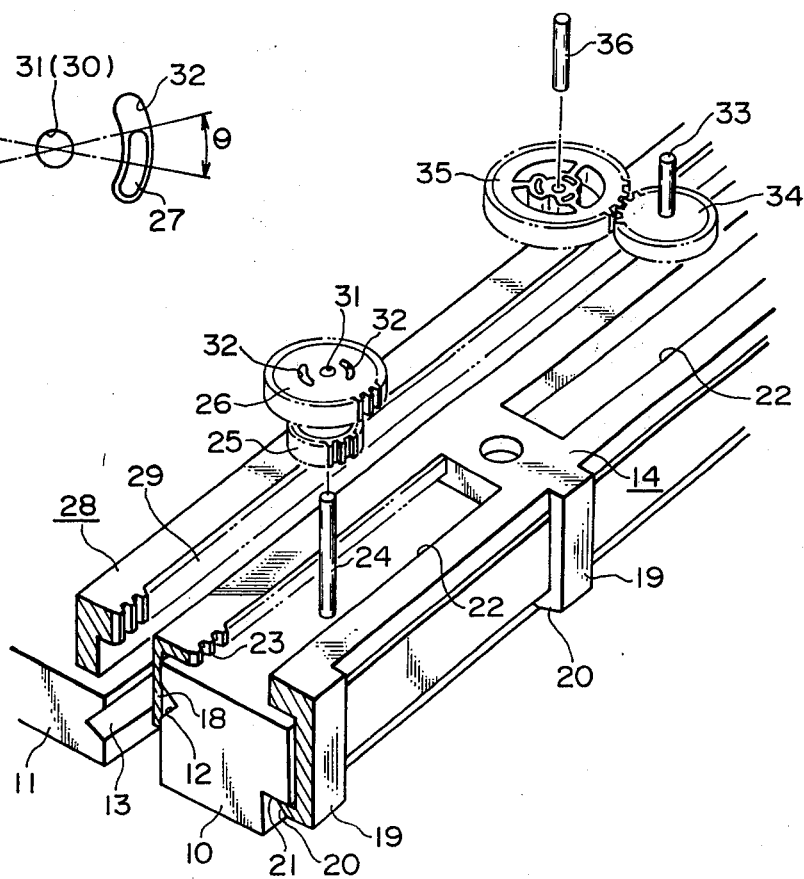

DRIVE MECHANISM FOR DISC PLAYER WITH BEARING SUPPORTED SLIDER

BACKGROUND OF THE INVENTION

The present invention relates to a position detecting mechanism, a retainer mechanism, a safety mechanism and a slider mechanism for a reading-out device in a disc player, which reading-out device enables the reading out of a signal recorded on the recording disc.

In case of an optical video disc player, a disc having a surface on which a number of pits are recorded is provided, a laser beam is projected onto the disc surface with the disc rotated at a high speed, and light reflected from the disc is optically read out and converted into an electric signal for reproduction of an image and/or sound. In such an optical video disc player, a reading device must be mechanically moved in a radial direction of the disc to follow the track of the disc. It is preferable that such movement be very smooth. For this reason, in the prior art disc players, V-shaped grooves are formed in a guide rail and a slider on which a reading-out device is fixedly mounted, roller bearings are inserted between both grooves and held by hemming parts thereof to thereby reduce kinetic friction. However, in the prior art construction, the retainer is moved only through bearings pressingly disposed between the slider and the guide rails, the bearings being movable and rotatable. If there is a slip of the bearing rotation, upon accumulation of enough slip, the retainer may deviate from the grooves of the guide rails. In order to prevent slip, it is necessary to support the bearings on both sides with a strong force of 10 kg or more. This leads to an inconvenience in use.

Moreover, it is preferable that the bearings always be in contact with the slider with a constant relationship therebetween in order to smoothly move the slider. However, in the prior art construction, there is no constant relationship between the bearings and the slider, and the bearings are not necessarily located on the gravitational center of the slider. Furthermore, the retainer is not directly held by any of the guide rail and the slider. It is, therefore difficult to accurately mount the retainer with respect to the guide rail and the slider during assembly. Also, it is necessary to hem parts of the retainer in order to prevent the roller bearings from falling out of the retainer.

In case of an optical video disc player, a reading device must be mechanically moved in a radial direction of the disc and follow the track of the disc. In general, the movement of the reading device is from the inside to the outside of the disc. In case that the disc is always rotated at a constant rotational speed (a CAV type), since the tracking error is more remarkable in the inner circumference of the disc than in the outer circumference thereof, when a reading device (pick-up) is located at a predetermined position, it is necessary to vary the gain of a tracking servo loop system to thereby decrease the gain at the inner circumference portion of the disc in comparison with the gain used at the outer circumference portion of the disc.

The sensitivity to tangential error is greater on the inside portion of the disc than on the outside portion thereof. Therefore, when the pick-up reaches a predetermined position, the gain of the tangential servo system is varied to thereby decrease the servo system gain at the inner circumference with respect to that in the outer circumference portion. On the other hand, in case that the tangential speed of the disc is maintained constant (a CLV type), to maintain a constant time error a greater compensation is needed in the inside portion of the disc than in the outside portion thereof. Accordingly, when the pick-up reaches the predetermined position, the gains of the spindle servo system must be changed to thereby increase the gain in the inner portion of the disc.

For these reasons, a detecting mechanism for detecting the direction of movement of the reading device in the radial direction of the disc is needed for the video disc player. Furthermore, a plurality of positions thereof must be detected. Thus, there is a need for a detecting mechanism for detecting the relative positions between the reading device and the disc with a high accuracy.

SUMMARY OF THE INVENTION

According to the present invention, cam means is integrally formed with a rack member fixed to a slider for driving the reading device or the spindle motor in the radial direction of the disc. With a switch operated by the cam means, the relative position of the reading device relative to the disc can be detected. The invention provides such a position detecting mechanism for a reading device for disc players.

Further according to the present invention, a retainer for restricting bearings is forcibly driven cooperating with the movement of the slider. Without any large force applied thereto, the slider and bearings are always maintained in a constant relationship to thereby provide a slider moving mechanism ensuring smooth movement of the slider. With such a construction of the present invention, the retainer can be integrally made of a synthetic resin.

Moreover, in view of the above noted defects, the present invention provides a retainer mechanism wherein rolling bearings are restricted by a retainer and the retainer is engaged with guide rails to thereby hold the retainer so that the retainer can be freely moved in a lengthwise direction of the guide rails. The assembly of the retainer, the guide rails and the slider can be readily carried out while applying a pressure in order to prevent the retainer from deviating from the desired position. Also, according to the present invention, with such a construction, the retainer can be integrally molded of a synthetic resin and the rolling bearings can be detachably held.

BRIEF DESCRIPTION OF THE DRAWINGS

FIG. 3 is a cross-sectional view of the moving mechanism of FIG. 2;

FIG. 5 is a view illustrating the relationship between both the gears;

FIG. 6 is an exploded view showing a retainer and adjacent parts in detail;

DESCRIPTION OF THE PREFERRED EMBODIMENTS

The present invention will now be described with reference to the accompanying drawings.

Figure 1:
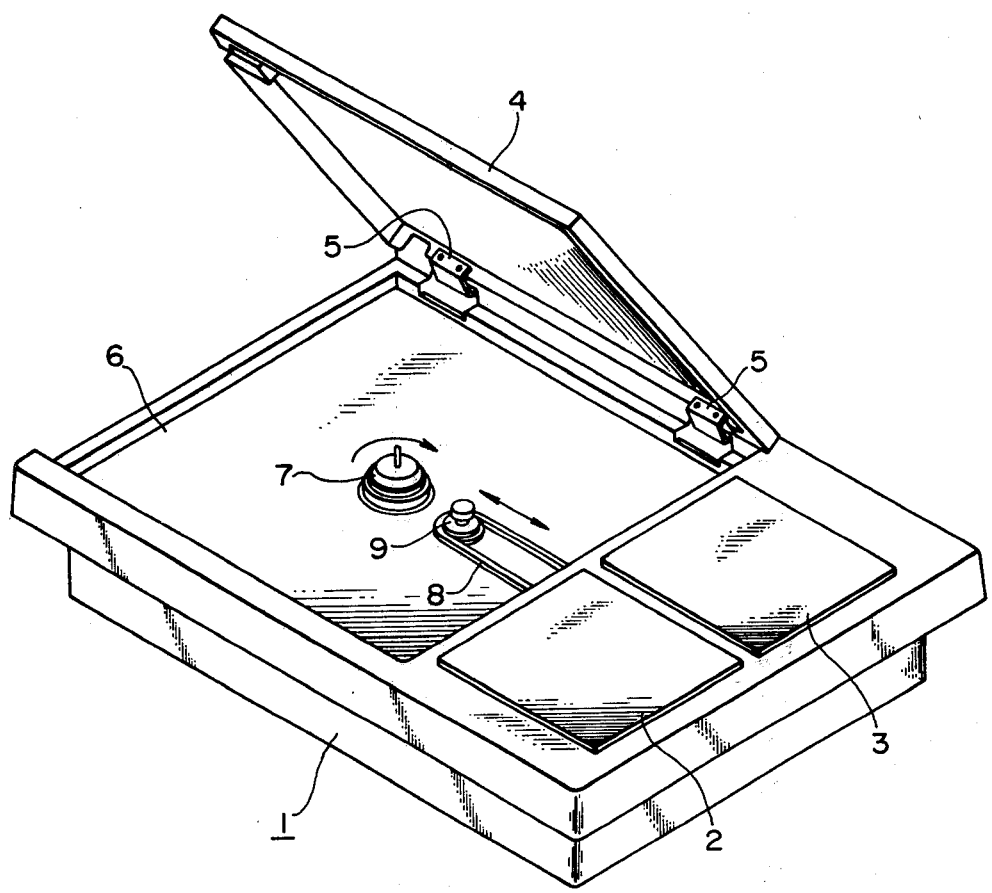
FIG. 1 is a perspective view of a embodiment of a video disc player according to the present invention.

FIG. 1 shows a perspective view of an optical video disc player body 1. On the right side and the upper side of the body 1, an operational section 2 and an indication section 3 are formed. A cover member 4 openable widely at hinges 5 is provided on the left side. An intermediate plate 6, which is horizontally provided at a shallow depth from an upper surface of the body 1, can be covered by the openable cover member 4. A spindle shaft 7 adapted to receive a disc to be played and which is rotated at a high speed projects from the center of the intermediate plate 6. In the intermediate plate 6 a slide opening 8 is formed in a radial direction from the spindle shaft 7. A head part of a reading device 9 into which a reflected beam from a laser source enters projects from the moving opening. The reading device 9 may be reciprocatingly moved along the slide opening 8. With such a construction, the disc (not shown) upon which is recorded a signal to be reproduced is fixedly mounted on the spindle shaft 7, the disc is rotated in one direction, and the reading device follows the track of the disc and is moved with the disc as it rotates so that the signal recorded on the disc surface can be read.

Figure 2:
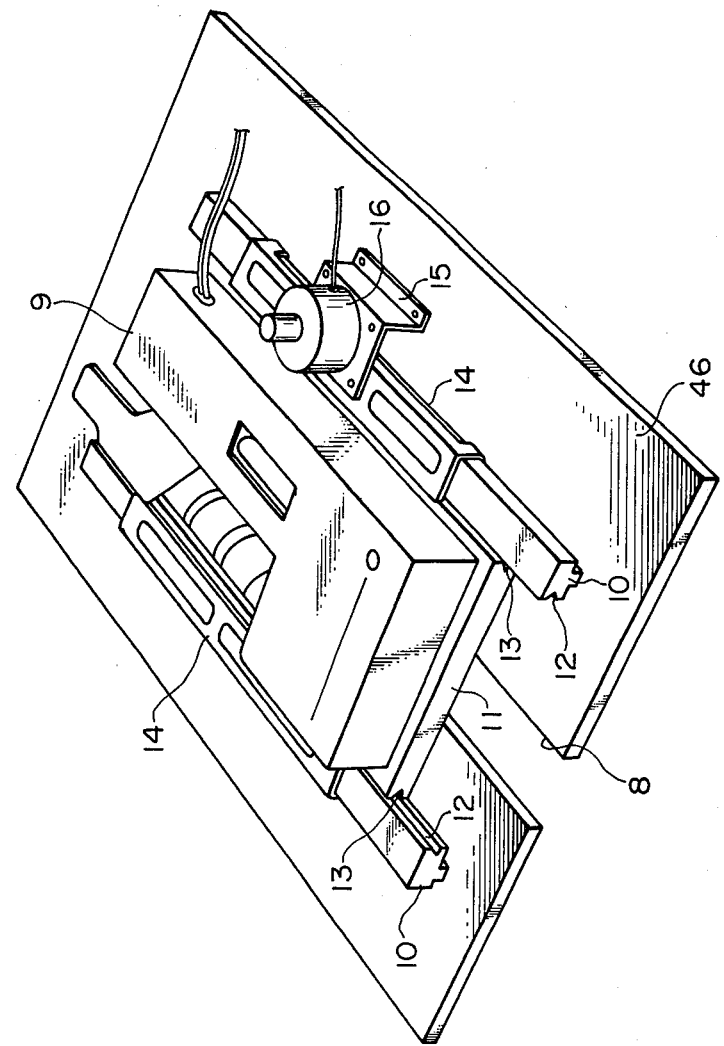
FIG. 2 is a perspective view showing a reading device and moving mechanism viewed in an upside down state.

FIG. 2 shows a bottom view of the reading device 9 as viewed from the underside of a mechanical chassis 46, which is disposed parallel to the intermediate plate 6. A pair of guide rails 10 are spaced parallel to each other on both side of the slide opening 8 and are fixed to the underside of the mechanical chassis so that a planar slider 11 carrying the reading device 9 is slidably supported on the guide rails 10. Between side surfaces of each guide rail 10 and the slider 11 are formed V-shaped bearing grooves 12 and 13 and cylindrical bearings are disposed in the bearing grooves 12 and 13 to thereby allow the slider 11 to move smoothly. A retainer 14 is slidably supported along each of the guide rails 10 so as to be movable in the longitudinal direction. By action of the retainers 14, the bearings are prevented from deviating from the V-shaped grooves 12 and 13. A motor support 15 made by bending a thin plate in the form of a Z-shape is fixed to a position close to the center of one side of the above-described guide rails 10. A drive motor 16 for moving the slider 11 is mounted on the motor support 15.

FIG. 3 shows a cross-sectional view of the reading device 9 in which a plurality (six per each retainer 14 in the described embodiment) of cylindrical bearings 17 are disposed between the bearing grooves 12 and 13. Each bearing is held by the retainer 14. The retainer 14 is integrally molded of a synthetic resin and is disposed parallel to an upper surface of each guide rail 10. A planar restrictor plate 18 of the retainer 14 for holding cylindrical bearings 17 extends vertically on each side of the guide rail 10 and confronts one side of the slider 11. An engagement plate 19 of the retainer 14 is vertically located on the opposite side of each rail 11. A claw portion 20 is formed at the end of each engagement plate 19 and is engaged with a shouldered portion 21 formed on the outer side of the guide rail 10.

With such a construction, the retainer 14 is movable in the longitudinal direction but not pulled apart therefrom upwardly by cylindrical bearings 17 engaged with the bearing groove 12 and restricted by the restrictor plate 18 and by the engagement plate 19. A longitudinal slot 22 is formed in the upper portion of each retainer 14 in the longitudinal direction thereof. On one side of each retainer 14, a rack 23 is formed in an inner wall of the retainer 14 having the slot 22. A support pin 24 is fixed to the upper surface of each of the above-described guide rails 10 extending through the slot 22. A driven gear 25 engaging with the rack 23 and a driving gear 26 are rotatably mounted on the support pin 24 coaxially with each other. The driven gear 25 and the driving gear 26 are coupled to each other by pins 27 extending from the upper surface of the driven gear 25. A longitudinal rack member 28 is fixedly provided to the upper surface of each of the above-described slider 11. Rack teeth formed on the rack member 28 are engaged with the above described drive gear 26.

Figure 4:
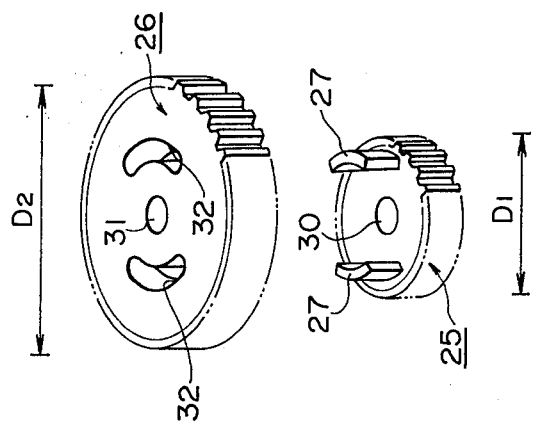
FIG. 4 is an exploded view of a driven gear and a drive gear.

FIG. 4 shows in detail the above-described driven and drive gears 25 and 26. An axial through-hole 30 is formed in the center of the driven gear 25. Confronting pins 27 are rigidly fixed to the driven gear at diametrically opposite positions. Also, an axial through-hole 31 is formed in the center of the drive gear 26 and confronting crescent-shaped engagement holes 32 are formed in the drive gear 26 at diametrically opposite positions. It is to be noted that the length of each engagement hole is somewhat longer than that of each of the above described pins 27. The diameter ratio of the driven gear 25 to the drive gear 26 is 1:2, that is, the ratio of the numbers of gear teeth is 1:2.

FIG. 5 shows a state where the drive gear 23 and the drive gear 26 are engaged with each other. The pins 27 inserted into the engagement holes are free to move through idle distances due to the length difference so that the driven gear 25 is freely rotatable through an angle of θ with respect to the drive gear 26.

FIG. 6 shows a mechanism related to the retainer 14 and the rack member 28. An output shaft 33 rotated through reduction gearing (not shown) by the drive motor 16 is rotatably supported from the motor support 15 downwardly, the output shaft 33 having an output gear 34 fixed thereto. A pivot pin 36 is rigidly coupled to the underside of the motor support 15. An intermediate gear 35 which engages with the output gear 34 is pivotally mounted around the pivot pin 36. The rack teeth 29 of the above-described rack member 28 are engaged with the intermediate gear 35 to thereby convert the rotational movement of the output shaft 33 to the linear reciprocating movement of the rack member 28.

Figure 7:
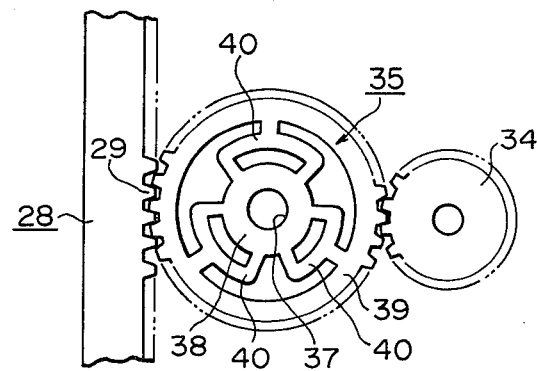
FIG. 7 is a partial view showing an output gear.

FIG. 7 shows a state where the above-described output gear 34, intermediate gear 35 and the rack member 28 are engaged with each other. As axial through-hole 37 is formed in the center of the intermediate gear 35. The intermediate gear 35 is composed of an inner annular portion 38 and an outer annular portion 39 axially spaced from each other. The inner and outer annular portions 38 and 39 are connected through three bifurcated portions 40. With such a construction, the intermediate gear 35 has a resiliency in the radial direction.

Figure 8:
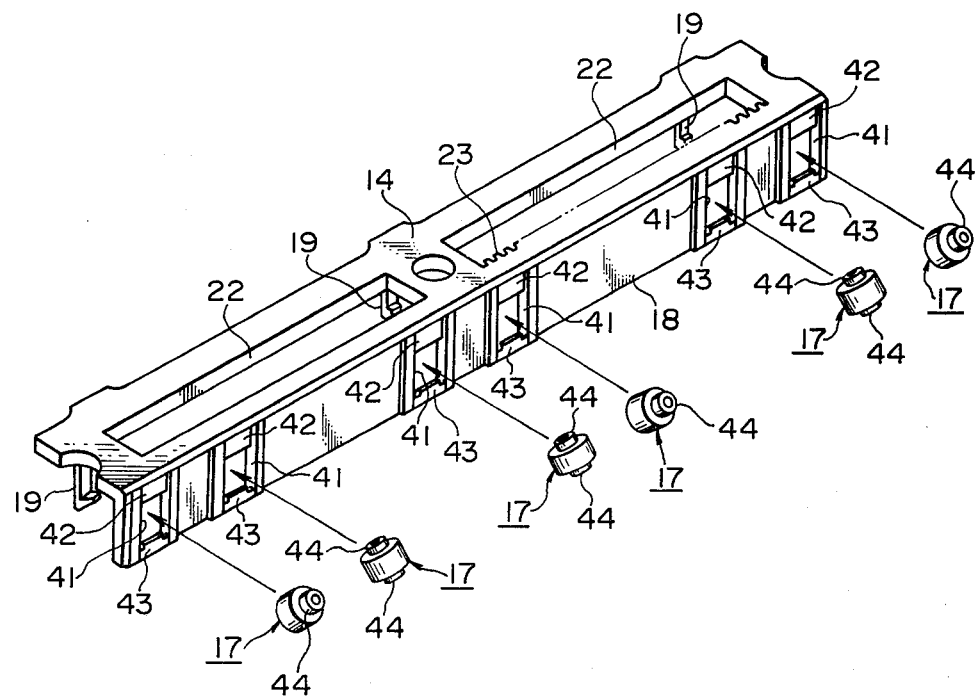
FIG. 8 is an exploded view showing the relationship between the retainer and the bearings.

FIG. 8 shows a relationship between the retainer 14 and the bearings 17. A plurality of rectangular windows 41 are formed at predetermined intervals in the restriction plate 18 disposed on one side of the retainer 14. Edge portions 42 and 43 each having tapered ends are formed at the upper and lower peripheries of each window 41. The above-described upper edge portions 42 are fixed to the restrictor plate 18 but the lower edge portions 43 are formed so as to have resiliency to thereby be capable of increasing or decreasing the area of the opening area of the window 41. The above-described bearings 17 are formed in the cylinders. Projections 44 are formed on the planar surfaces thereof in order to prevent the removal of the cylindrical bearing. With respect to the dimensional relationship between the window 41 and the bearings 17, the distance between the right and left walls of the window 41 is somewhat greater than the diameter of one of the bearings 17.

Figure 9:
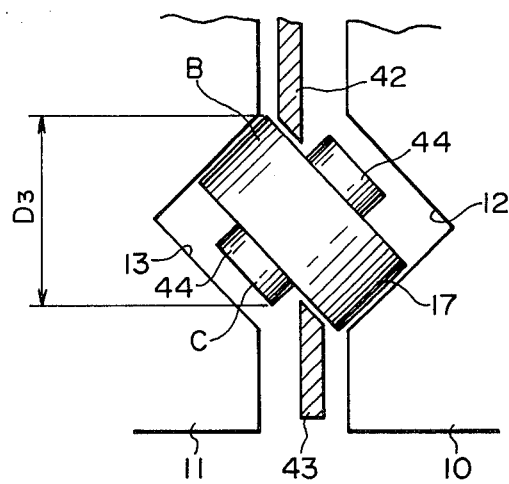
FIG. 9 is a cross-sectional view showing the bearings disposed in the bearing grooves.

FIG. 9 shows a relationship among the bearing 17, the bearing grooves 12 and 13, and the edge portions 42 and 43. The bearing 17 is rotatably supported by the V-shaped bearing grooves 12 and 13 at a slanted angle of 45°. The edge portions 42 and 43 are located at shouldered portions defined by the projections 44. Accordingly, even if the retainer 14 is removed from the bearing grooves 12 and 13, the bearings 17 cannot be removed from the windows 41 with the edge portions held by the bearings 17 and the projections.

Figure 10:
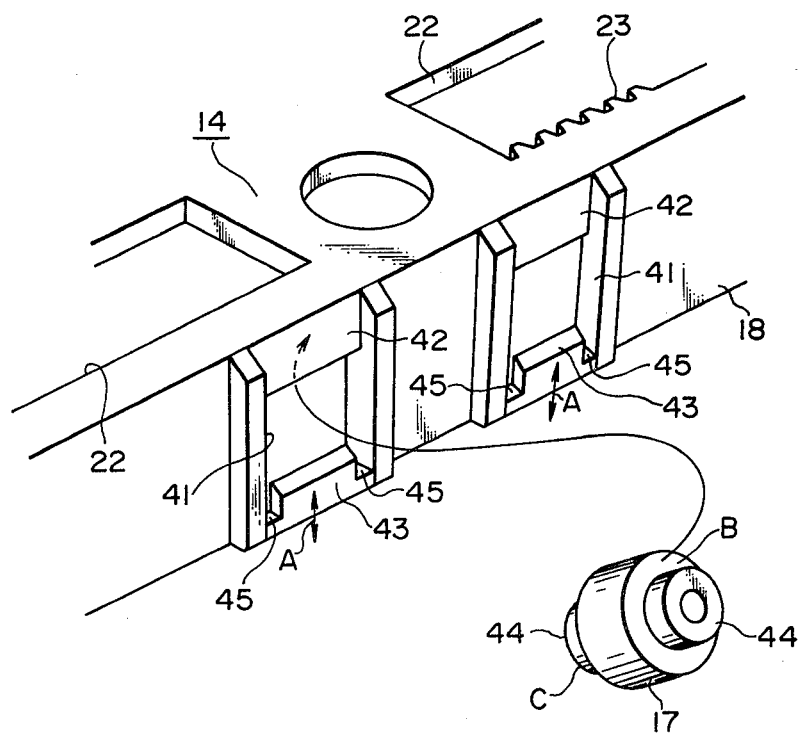
FIG. 10 is a partial enlarged view showing the mounted state of the bearing.

FIG. 10 illustrates the mounting of a bearing 17 on the edge portions 42 and 43. The upper edge portion 42 is fixed at both ends to the restrictor plate 18 whereas the lower edge portion 43 is resiliently supported at both ends through thinner bridge portions 45. For this reason, the position of the upper edge portion 42 is fixed with respect to the retainer 14 but the lower edge portion 43 is movable to some extent up and down in the vertical direction as indicated by an arrow A.

In order to mount the bearing 17 onto the retiner 14, first the bearing 17 is tilted at an angle of about 45° and then the upper portion B of the bearing 17 is engaged with the upper edge portion 42. In this condition, since the distance between the edge portions 42 and 43 is somewhat smaller than the distance 3 between the upper portion B of the bearing 17 and the lower end portion C of the projection 44, the lower end portion of the projection 44 is in contact with the edge portion 43 so that the bearing 17 is not fully inserted into the interior of the window 41. Then, when the bearing 17 is further depressed, the lower edge portion 43 is lowered by the lower end portion C of the projection 44 to thereby increase the opening area of the window and to thereby allow the lower projection 44 to enter the window 41. Immediately thereafter, the lower edge portion 43 is restored by its resiliency and is engaged with the shouldered portion of the projection 44. As a result, the bearing 17 cannot be pulled apart from the window unless a large force is applied against the resilient force of the edge portion 43. Thus, the retainer 14 on which the bearing is mounted is inserted in the longitudinal direction of one of the guide rails 10 fixed to the mechanical chassis 46 by, for example, screws so that the bearing 17 corresponds to the bearing groove 12 and the claw portion 20 corresponds to the shouldered portion 21, respectively. As a result, the retainer 14 can be held by the guide rail 10. Thereafter, the other guide rail 10 carrying the retainer 14 in the same manner is fixed to the mechanical chassis by, for example, screws, the other guide rail being biased through the slider 11 in the direction of the first-mentioned guide rail by a spring (not shown) or the like. In this case, the positioning of the slider 11 and the retainer 14 with respect to the guide rail 10 can be readily carried out because the retainer 14 is already held to the guide rails 10.

Figure 11:
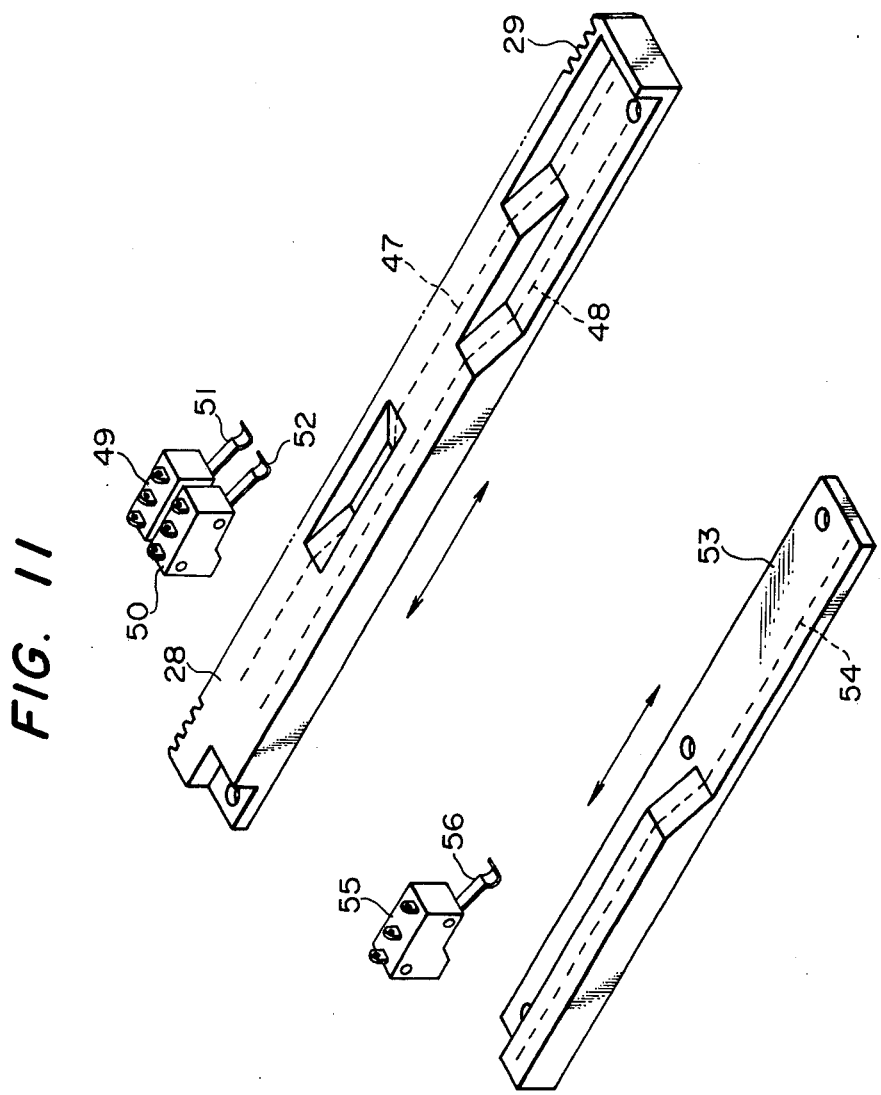
FIG. 11 is a perspective view showing a position detecting mechanism.
Figure 12:
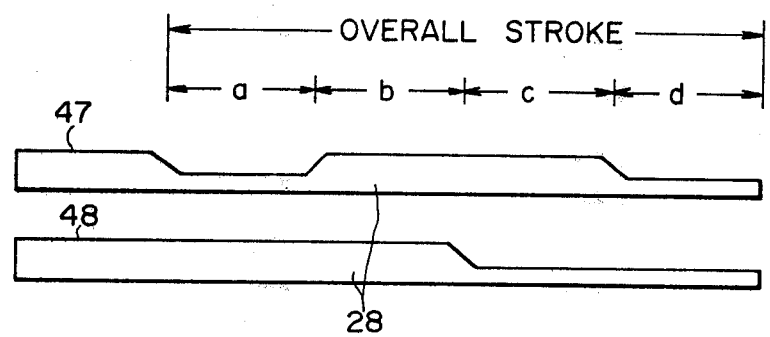
FIG. 12 is an illustration showing a relationship of a cam surface and switches.
Figure 12:
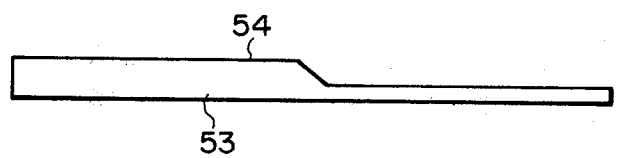

FIG. 11 shows a position detecting mechanism. On the upper surface of the rack member 28, two linear cam surfaces 47 and 48 are formed in its longitudinal direction, the cam surfaces being molded integrally with each other. Each of the cam surfaces has a shouldered portion in the vertical direction. The shapes of the cam surfaces are different from each other. Their cross sections are shown in FIG. 12. Namely, the overall stroke of the reciprocation of the slider 11 is divided into four sections, a, b, c and d, each having the same length. In the cam surface 47, the sections a and d are in the form of recesses whereas in the cam surface 48 the sections c and d are in the form of recesses. Two microswitches 49 and 50 supported by the motor support 15 are mounted in parallel at the upper portion of the rack member 28. Arms 51 and 52 of the microswitches 49 and 50 are in contact with respective cam surfaces. Reference numeral 53 designates a cam member 53 adapted to detect the position of the central portion of the slider 11. As shown in FIG. 12, a cam surface 54 formed on the upper surface of the cam member 53 has a recess formed in its central portion. An arm 56 of a microswitch 55 is in contact with the cam surface 54.

The operation of the above-described embodiment of the invention will now be described.

The cover member 4 is opened to expose the interior and a selected video disc (not shown) to be reproduced is placed upon the spindle shaft 7. Then, the cover member 4 is closed and the operational section 2 is operated to thereby render the body 1 operational. The spindle shaft 7 is rotated at a high speed and the video disc is rotated together therewith. At the same time, a laser beam is shone from the reading device 9 projecting onto the surface of the video disc. The reflected beam is again introduced into the reading device 9 where the signal recorded on the video disc is converted to an electric signal. In the signal reading operation, if the reading device 9 is stopped at a constant position on the circumference of the disc surface, only a repeated signal can be read. Therefore, the reading device 9 must be moved in the radial direction. By movement of the reading device 9, the projecting position of the laser beam can follow the track of the video disc to thereby reproduce an image, sound or the like.

Proper movement of the reading device 9 is important for the video disc player. The reading device 9 is moved by the slider 11. Smooth movement of the slider 11 is ensured in the longitudinal direction of the guide rails 10 by the bearing 17. The movement of the slider 11 for accurately following the track is due to the action of the drive motor 16. The output rotation of the drive motor 16 is derived from the output shaft 33 through the reduction gearing. The rotation of the output shaft 33 rotates the output gear 34 and to thereby rotate the intermediate gear 35. The rotation of the intermediate gear 35 causes the rack member 28 to be moved through the rack teeth 29 engaged with the intermediate gear 35. Since the rack member 28 is fixed to the slider 11, the slider 11 is reciprocatingly moved along the rails 10. As shown in FIG. 7, since the intermediate gear 35 is composed of the inner and outer portions connected through the bifurcated portions 40, the intermediate gear 35 has a resiliency against an applied force in the radial direction. Even if the output gear 34 is pushed in the direction of the rack member 28, the intermediate gear 35 is deformable due to this resiliency. Therefore, the intermediate gear 35 is maintained in engagement with the rack member 28 with a pressure. For this reason, no backlash is generated between the output gear 34 and the intermediate gear 35 and between the intermediate gear 35 and the rack member 28.

The slider 11 is thus accurately moved in response to a control signal. When the slider 11 is moved, the bearings 17 pressingly disposed between the slider 11 and the guide rail 10 are rotated and moved in the same direction as the slider 11. Therefore, assuming that slip does not occur between the bearings 17 and the associated races, since the guide rails 10 are fixed, the retainer 14 holding the bearings 17 is moved at half the speed of the slider 11 in the direction of the slider 11 movement. Therefore, the amount movement of the retainer 14 is half of that of the slider 11. As far as no slip of the bearings is generated, even if the movements of the slider 11 are repeated, the retainer 14 cannot be removed. In previous constructions, the slip of the bearing rotation was not negligible and the slip could accumulate so that the retainer 14 deviated from the guide rails. However, with the use of the present invention, when the above-described rack member 28 is moved, the drive gear 26 engaged with the rack teeth 29 is rotated around the pivot pin 24 and the rotation of the drive gear 26 is transferred to the driven gear 25 through the pins 27. The driven gear 25 is rotated around the pivot pin 24. Since the rack 23 is engaged with the driven gear 25, the retainer 14 is forcibly moved in the same direction as the rack member 28. Moreover, since the ratio of the number of teeth of the driven gear 25 to the drive gear 26 is established at 1:2, the retainer 14 is forcibly moved as there is no slip in the bearing rotation and there is no possibility of the deviation of the retainer 14 from the guide rails 10. Since the drive gear 26 and the driven gear 25 are coupled in the manner shown in FIG. 4 and the length difference between the pins 27 and the engagement slots 32 of the driven gear 25 is determined by an idle angle $\theta$ as shown in FIG. 5. This facilitates the assembly of the drive and driven gears 26 and 25. At the same time, the drive gear 26 is adapted to rotate the driven gear 25 after a relative displacement between the slider 11 and the retainer 14 is accumulated to some extent. For this reason, when the slip amount of the bearing rotation is within the allowance range, no unnecessary force is imparted to the retainer 14. Therefore, without any unduly high force applied to the drive motor 16, the slider 11 and the retainer 14 are both smoothly movable.

According to the present invention, the slider used in the reading device of the invention can be smoothly moved by the bearings along the guide rails. Since the bearings are restricted by the retainer, the retainer does not deviate from the guide rails without the lateral pressure applied to the bearings being enhanced. Thus, no unduly high force is applied to the retainer. Therefore, no unduly high force is applied to the drive motor 16, the retainer 14 is moved through a distance half that of the slider 11 at the midpoint thereof, and the slider 11 is not displaced to the end of the retainer 11 to thereby primarily retain the central portion to which the weight is applied.

With such a construction of the present invention, the retainer for restricting the retainer is moved in the same direction as the slider along with the movement of the slider, and the contact position of the bearings and the slider is limited to a specific range to thereby prevent deviation of the retainer from the guide rails due to accumulation of slip.

According to the present invention, the slider provided in the reading device is smoothly moved by the bearings along the guide rails. Since the bearings are restricted by the retainer, the retainer cannot deviate from the guide rails without a large lateral pressure being applied to the bearings. For this reason, no unduly high force is applied to the retainer. As a result, the retainer can be made of a synthetic resin. Moreover, since a synthetic resin retainer can be used, the bearings can be detachably mounted. In addition, since the retainer is supported and engaged with the guide rails, the retainer is easy to handle, for example, when the retainer is assembled into the guide rails and the slide at appropriate positions.

Next, the operation of the position detecting mechanism will be described.

The rack member 28 is moved according to the slider 11. At this time, during the movements of the cam surfaces 47, 48 and 54, the levers 51, 52 and 56 of the microswitches 49, 50 and 55 are swung to thereby set the switches to the on-state or to thereby turn them off. The output waveforms of the microswitches 49, 50 and 55 are shown in FIG. 12. The respective section positions a, b, c and d are distinguishable according to the output voltages of "H" and "L" outputted from the microswitches 49 and 50. With respect to the output waveform of the microswitch 55, the signals "H" and "L" are changed over at the center of the slider 11 movement range so that it is known that the pick-up is located at the center of the disc.

Figure 13:
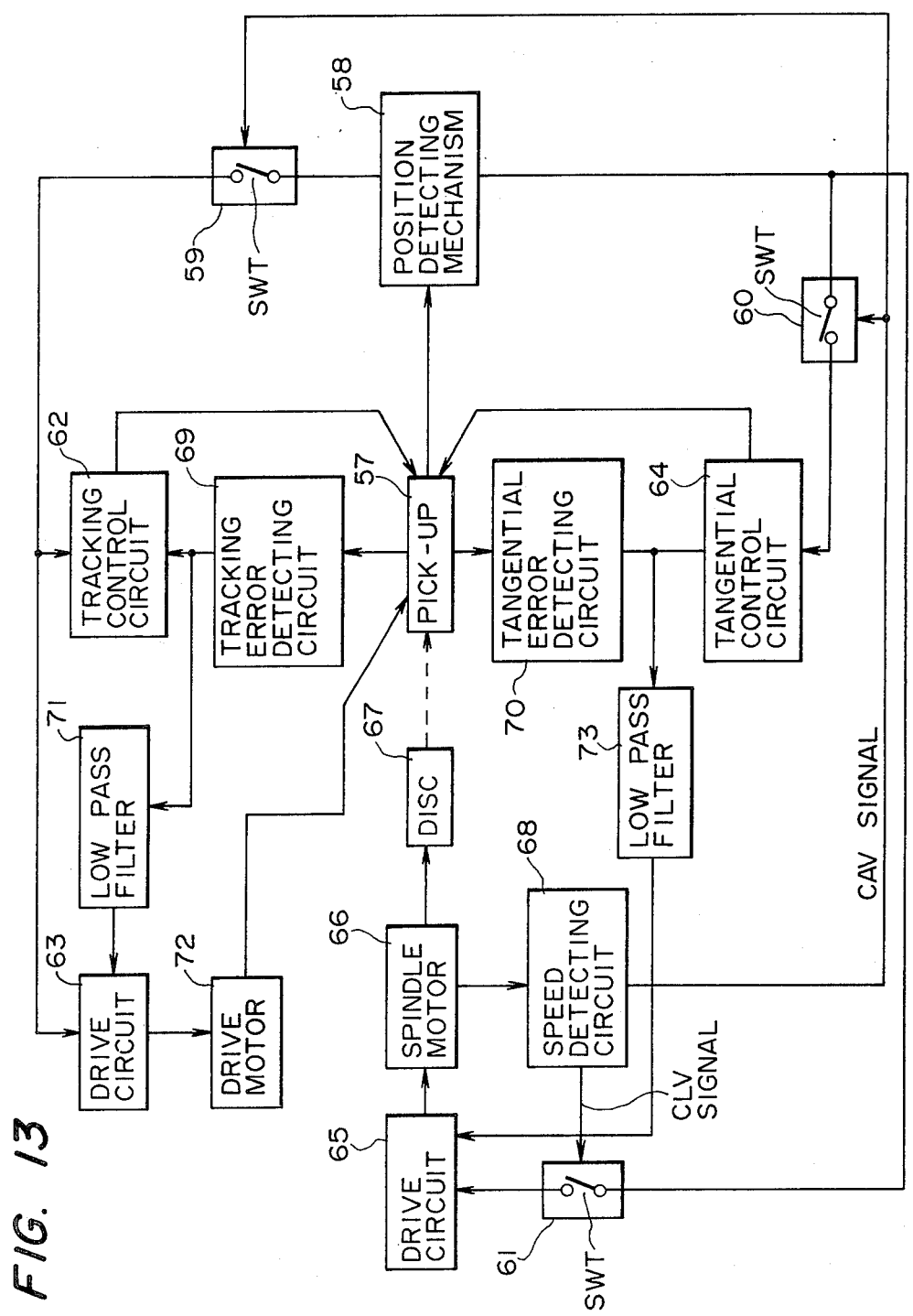
FIG. 13 is a block diagram showing a control system.

FIG. 13 shows a relationship between the position detecting mechanism and the control therefor. The position of the pick-up 57 is detected by the position detecting mechanism 58. A signal outputted from the position detecting mechanism 58 is supplied to a tracking control circuit 62 and a drive circuit 63 via a switch 59 and is supplied to a tangential control circuit 64 via a switch 60 and to a drive circuit 65 via a switch 61. A spindle motor 66 is connected to the drive circuit 65 to thereby rotate the disc 67. A speed detecting circuit 68 is connected to the spindle motor 66. A CLV signal and a CAV signal generated by the speed detecting circuit 68 are supplied to a switch 61 and to switches 59 and 60, respectively. The output signal from the pick-up 57 is applied to a tracking error detecting circuit 69 and a tangential error detecting circuit 70. A tracking servo system is composed of the pick-up 57, the tracking error detecting circuit 69 and the tracking control circuit 62. A tangential servo system is composed of the pick-up 57, tangential detecting circuit 64 and the tangential error detecting circuit 70. An output of the tracking error detecting circuit 69 is supplied to a drive circuit 63 via a low-pass filter 71. An output of the drive circuit 63 is applied to a drive motor 72 (which is the same as the drive motor 16 shown in FIG. 2) which is adapted to move the pick-up 57 in the radial direction of the disc.

An output of the tangential error detecting circuit 70 is applied to the drive circuit 65 via a low-pass filter 73. A spindle servo system is made up of the pick-up 57, the tangential error detecting circuit 70, the low-pass filter 73, the drive circuit 65 and the spindle motor 66. A drive motor servo system is made up of the pick-up 57, the tracking error detecting circuit 69, the low-pass filter 71, the drive circuit 63 and the motor 72.

With such a construction, the output of the pick-up 57 is discriminated. Feedback control is carried out by the tracking servo system and the drive motor system so that the position of the pick-up 57 is always on the track. Also, feedback control is performed by the tangential servo system and the spindle servo system so that time-axis error is minimized. When the pick-up 57 is moved in the tracking direction to thereby vary its position, the position of the pick-up 57 is detected by the position detecting mechanism 58 to thereby supply signals which vary respective gains of the tracking control circuit 62, the drive circuit 63, the tangential control circuit 64 and the drive circuit 65. The respective signals are applied via the switches 69, 60 and 61. The switches 59 and 60 and the switch 61 are turned on when the CAV signal from the speed detecting circuit 68 is applied to the switches 59 and 60 and when the CLV signal is applied to the switch 61. As a result, the gains of the respective servo loop systems are varied corresponding to the position of the pick-up 57 to thereby achieve the desired control.

Figure 14:
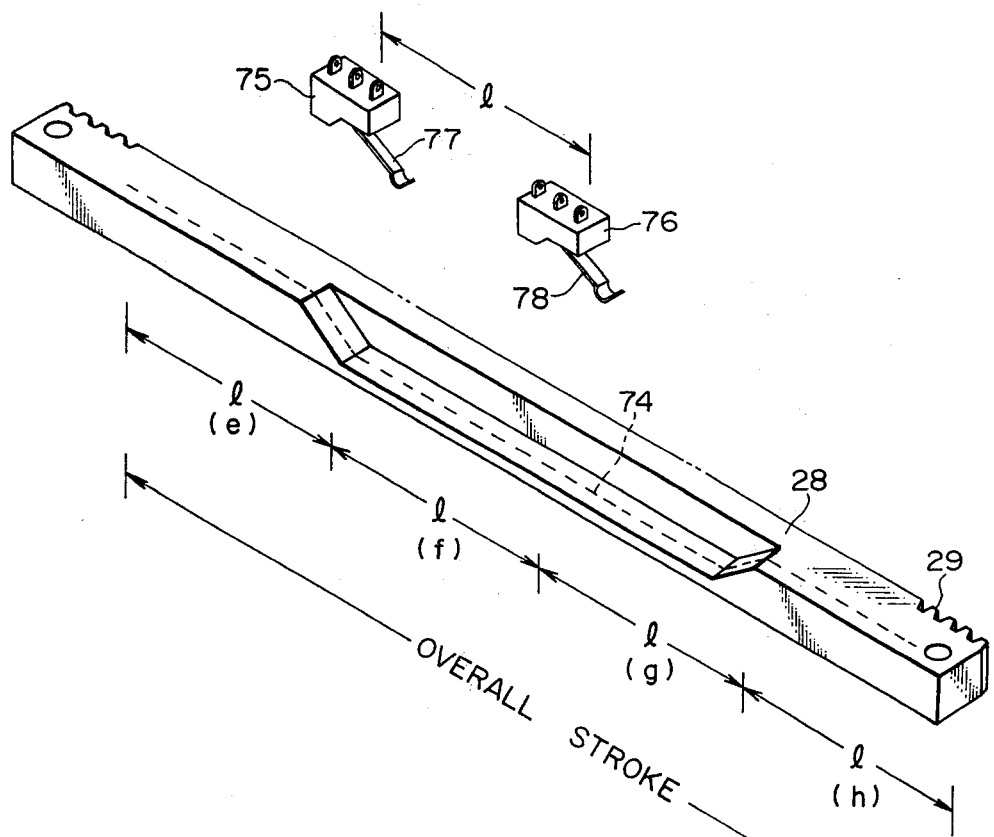
FIG. 14 is a perspective view of a position detecting mechanism of another preferred embodiment.

FIG. 14 shows another embodiment of a position detecting mechanism according to the present invention. Linear cam surfaces 74 are formed on the rack member. The overall range of the rack member 28 is divided into four sections, as designated by e to h, each having a length l, the sections f and g being concave. A pair of microswitches 75 and 76 are spaced by a distance L confronting each other. Arms 77 and 78 of the respective microswitches 75 and 76 are in contact with the cam surfaces 74.

Figure 15:
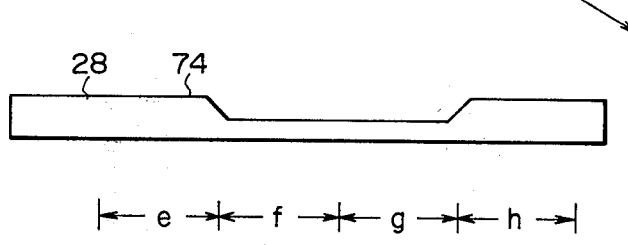
FIG. 15 is an illustration showing the relationship between the cam surfaces and the switches.

FIG. 15 is an illustration showing the operation of the position detecting mechanism shown in FIG. 14. Since the microswitches 75 and 76 are spaced by the length l along the cam surface 74, the operations of the cam are different from each other. According to combinations of the outputs of the two switches 75 and 76, the positions in the four sections e to h on the cam surface 74 can be discriminated. Here, there is no possibility of malfunction of the microswitches 49 and 50 with respect to the opposite cam surface 47 and 48.

With the present invention, the rack and the cam are made integral with each other the number of mechanical parts needed is minimized, and the assembly work and adjustment are facilitated.

In the prior art construction, since the reading device (or a disc rotating motor) fixed to the slider has a rather large weight, if the video disc player is tilted, the slider is likely to slide in the direction of tilting. The load due to tilting is as a whole applied to the gears engaged with the racks. When the load is increased, the teeth of the racks and gears can be broken.

Overcoming the above-noted defects, the present invention provides a safety mechanism for the moving mechanism in disc record players, wherein a clutch device is provided for releasing the cooperation between the rack and the gear when the load is increased whereby breakdown is prevented.

Figure 16:
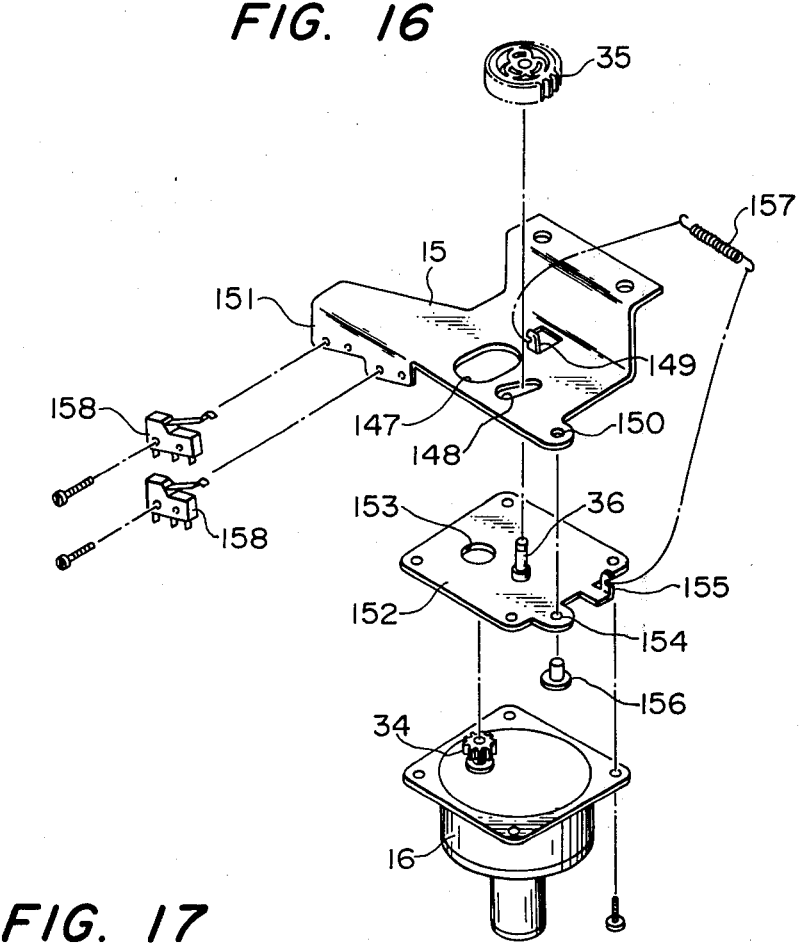
FIG. 16 is an exploded view of a clutch mechanism.

FIG. 16 is an exploded view of a clutch mechanism of the invention. An oblong gear receiving operation 47 and a pin receiving opening 148 are formed close to the center of the motor support 15. A spring stop 149 is cut and formed in the vicinity of the gear receiving openings 147. Furthermore, at an end of the motor support 15 is formed an axial hole 150. At the diametrically opposite portion of the motor support 15 is formed a bent switch mounting portion 15. Reference numeral 152 denotes a swingable plate which is planar square-shaped and which is provided with the pivot pin 36 rigidly coupled thereto. In the vicinity of the pivot pin 36 is formed a throughhole 153 through which the gear 34 passes. On one side of the swingable plate 152 are located an axial operating 154 and a spring stop 155.

In order to assemble the clutch mechanism, since the output gear 34 is rotatably mounted on the drive motor 16 in which the reduction gearing (not shown) is encased, the output gear 34 is projected through the throughhole 153 and then the drive motor 16 is secured to the swingable plate 152 using screws. The swingable plate 152 is confronted with the motor support 15, and the output gear 34 and the pivot pin 36 are inserted into the gear receiving opening 47 and the pin receiving opening 48, respectively. A pivot pin 156 is inserted into the two axial holes 150 and 154 with both axial holes being aligned with each other. Thus, the swingable plate 152 is swingable mounted on the motor support 15. Thereafter, a coil spring 157 is disposed between the paired spring stops 149 and 155 so as to thereby normally bias the swingable plate 152 in one direction. Then, the intermediate gear 35 is rotatably mounted on the pivot pin 36. Also, microswitches 158 for detecting the position of the reading device 9 are secured using screws to the above-described switch stop portion 151.

Figure 17:
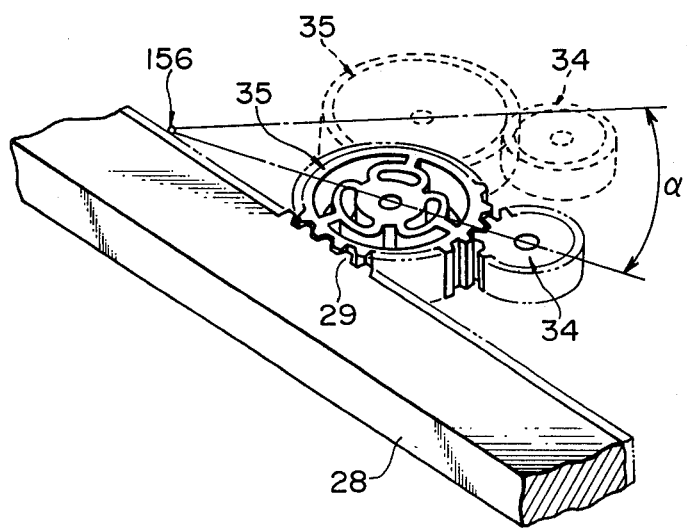
FIG. 17 illustrates the operation of the clutch mechanism.

If the video disc player 1 is tilted or if a shock force is applied thereto, since the reading device 9 has a rather large weight, the slider is subjected to a force urging the slider 11 to move in the direction of the guide rails 10 due to the gravitational or inertia force. The force causing the slider 11 to move is applied to the intermediate gear 35 which is engaged with the rack member 28, as a result of which the intermediate gear 25 tends to be rotated. However, since the output gear 34 is engaged with the intermediate gear, the intermediate gear is not freely rotated, and if the load applied to the rack member 28 is small, the slider is maintained at its position. However, if the load causing the slider 11 to move is increased, the intermediate gear 35 does not withstand the load and the swingable plate 152 is rotated against the force of the coil spring 157. As a result, the engagement between the rack teeth 29 and the intermediate gear 35 is released so that the slider is freely slidable. As shown in FIG. 17 since the swingable plate 157 can be swung through an angle of α around the axial pin 156, if a force which is not resistive by the coil spring 157 is applied to the intermediate gear 35, the intermediate gear 35 will be disengaged. When the slider 11 has slid to the upper limit of the allowance range thereof, the slider 11 is in abutment with a stop (not shown) made of rubber and disposed at an end thereof and the slier 11 is then stopped. Thereafter, the intermediate gear 35 restored by the tension of the coil spring 157 is again engaged with the rack teeth 29 and is ready for a subsequent operation.

In the specific embodiment described, the intermediate gear 35 is swingable to thereby enable the release of engagement with the rack member 28, although the invention is not limited to this embodiment. A clutch which slides when a predetermined rotational torque is applied to the intermediate gear 35 can be used.

When, due to a force from the outside applied to the slider, the slider is moved, the clutch mechanism is actuated to thereby release the engagement of the rack and the gear so that the slider can be freely moved. Accordingly, no unduly high force or stress is applied to the tooth surfaces of the rack and gear. Tooth breakage is thus prevented and the mean time between repairs of the disc player is reduced.

It will also be apparent that, while the embodiments of the present invention has been described exemplifying the reading device drive mechanism for video disc players, the present invention is applicable not only to such a type of drive mechanism but to any other types of drive mechanism for disc players, for example, a spindle rotation device drive mechanism, in which the spindle rotation device is movable in a radial direction of the disc rotated by the spindle rotation device relative to a fixed reading device, a drive mechanism for PCM (pulse code modulation) audio disc player and so on.

What is claimed is:

1. A drive mechanism for a disc player comprising: a chassis; a pair of guide rails spaced at a predetermined distance and fixed to said chassis parallel to each other; a plurality of bearings; a slider having both sides thereof contacting corresponding sides of said guide rails through said bearings; a retainer for restricting deviation of said bearings, said retainer having first means for restricting said bearings and second means for engaging said guide rails, said retainer engaging said slider through said bearings, said retainer being slidable in a longitudinal direction of said guide rails.

2. The drive mechanism of claim 1 wherein said retainer is made of a synthetic resin.

3. The drive mechanism of claim 1 wherein said retainer is provided with windows through which said bearing is insertable, at least an edge portion of said windows having resiliency, each of said bearings being detachably mounted in one of said windows.

4. The drive mechanism of claim 1 wherein said bearings are cylindrically shaped and have edge portions engaged with V-shaped grooves in said guide rails and said slider.

5. A drive mechanism for a disc player comprising: a pair of guide rails spaced at a predetermined distance and mounted parallel to each other; a plurality of bearings; a slider having sides contacting respective sides of said guide rails through said bearings; a retainer having first means for restricting deviation of said bearings and second means engaged with said guide rails so that said retainer can be moved along the longitudinal direction of said guide rails; said retainer engaging said slider through said bearings, a rack fixed to said slider, said slider being driven along said guide rails by gearing of said rack fixed to said slider while said retainer is forcibly driven by movement of said slider.

6. The drive mechanism of claim 5 further comprising a gear which is engaged with said rack fixed to said slider, said gear having a resiliency in a radial direction thereof, wherein said gear is maintained engaged with said rack with a predetermined pressure.

7. The drive mechanism of claim 5 further comprising a drive gear engaged with said rack fixed to said slider and a driven gear coupled to said drive gear and engaged with a rack formed on said retainer, a ratio of number of gear teeth of said drive gear to said driven gear being 2:1, wherein said driven gear cooperates with said drive gear to thereby drive said retainer with half an amount of movement of said slider.

8. The drive mechanism of claim 7 wherein said drive gear and said driven gear are supported coaxially on one shaft, and wherein said drive gear and said driven gear have an idle rotation.

9. The drive mechanism of claim 8 wherein said drive gear and said driven gear are coupled through at least one pin rigidly fixed to one of said drive gear and said driven gear extending into an aperture in the other of said drive gear and said driven gear, said aperture being dimensioned to provide said idle rotation.

10. The drive mechanism of claim 5 wherein said retainer is made of synthetic resin.

11. The slider moving mechanism of claim 5 wherein said retainer is provided with windows through which said bearings are insertable, edge portions of said window supporting said bearings at tapered ends thereof, and at least one of said edge portions having a resiliency providing a stretchable opening area.

12. A drive mechanism for a player comprising: a chassis; a pair of guide rails spaced at a predetermined distance and fixed to said chassis parallel to each other; a slider having both sides thereof contacting corresponding sides of said guide rails; a rack fixed to said slider extending in a moving direction of said slider; a drive motor; a gear driven by said drive motor engaged with said rack; a clutch mechanism operatively disposed for releasing engagement between said gear and said rack when a load greater than a predetermined load is applied to said gear; said clutch mechanism comprises a swingable plate secured to said drive motor; a pivot pin rigidly fixed to said swingable plate; a motor support having a gear receiving opening receiving said pin for defining a range of swinging movement of said swingable plate; a spring extending between said swingable plate and said motor support; and a pivot pin rotatably coupling edge portions of said swingable plate and said motor support.

13. A drive mechanism for a disc player comprising: a chassis, a pair of guide rails spaced at a predetermined distance and fixed to said chassis parallel to each other; a slider having both sides thereof in contacting corresponding sides of said guide rails; a rack fixed to said slider extending in a moving direction of said slider; a gear driven by a drive motor engaged with said rack, wherein upon rotation of said gear said slider is moved in a tracking direction; a cam formed integrally with said rack disposed within a stroke of said slider; and a switch for detecting a position of said cam position provided confronting said cam, a position of a reading device within the stroke of said slider with respect to a disc being played being detected with a signal of said switch.

14. The drive mechanism of claim 13 wherein first and second linear cams are formed in said rack, and further comprising first and second switches positioned to be actuated by corresponding ones of said cams, signals provided from said two switches being determinative of said position of said reading device with respect to said disc.

15. The drive mechanism of claim 13 wherein a single linear cam is formed in said rack, and further comprising a plurality of switches positioned to be actuated by said cam, signals provided from said switches being determinative of said position of said reading device with respect to said disc.

16. A drive mechanism of claim 13, further comprising a plurality of bearings disposed between said guide rail and said slider; and retainer to restrict deviation of said bearings, said retainer having a first means for restricting said bearings and a second means for engaging said rails, said retainer engaging said slider through said bearings.

* * * * *